(12) United States Patent
Johnson et al.

(10) Patent No.: US 8,832,819 B2
(45) Date of Patent: *Sep. 9, 2014

(54) LOAD BALANCING AND FAILOVER OF GATEWAY DEVICES

(71) Applicants: Robert A. Johnson, Pottstown, PA (US); Kathleen Wild, Collegeville, PA (US); Gerald Quammen, Downingtown, PA (US)

(72) Inventors: Robert A. Johnson, Pottstown, PA (US); Kathleen Wild, Collegeville, PA (US); Gerald Quammen, Downingtown, PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/689,877

(22) Filed: Nov. 30, 2012

(65) Prior Publication Data

US 2014/0157042 A1  Jun. 5, 2014

(51) Int. Cl.
*G06F 21/00* (2013.01)
*G06F 15/173* (2006.01)

(52) U.S. Cl.
USPC .............................. 726/12; 709/241; 709/239

(58) Field of Classification Search
None
See application file for complete search history.

(56) References Cited

U.S. PATENT DOCUMENTS

| 6,973,496 | B2 | 12/2005 | Hayes |
| 8,281,127 | B2 | 10/2012 | Hayes |
| 2006/0089994 | A1 | 4/2006 | Hayes |
| 2012/0072717 | A1 | 3/2012 | Hayes |

*Primary Examiner* — Fikremariam A Yalew (74) *Attorney, Agent, or Firm* — Richard J. Gregson (57) ABSTRACT

Methods and systems for load balancing and failover among gateway devices are disclosed. One method provides for assigning communication transaction handling to a gateway. The method includes receiving a request for a license from a computing device at a control gateway within a group of gateway devices including a plurality of gateway devices configured to support communication of cryptographically split data. The method also includes assigning communications from the computing device to one of the plurality of gateway devices based on a load balancing algorithm, and routing the communication request to the assigned gateway device.

19 Claims, 9 Drawing Sheets

LOAD BALANCING AND FAILOVER OF GATEWAY DEVICES

This Application claims the benefit of U.S. Patent Application as a divisional application to an application by JOHNSON ET AL., Entitled "LOAD BALANCING AND FAILOVER OF GATEWAY DEVICES," filed Nov. 30, 2009, Ser. No. 12/627,481, recently issued, awaiting patent number.

TECHNICAL FIELD

The present disclosure relates to load balancing and failover techniques and systems for use in gateway devices.

BACKGROUND

Gateway devices can be used to separate trusted and untrusted networks, allowing only authorized devices in an untrusted portion of a network to access data or resources in a trusted portion of a network. Such gateway devices typically validate the identity of systems on the untrusted networks and selectively allow access to the resources in trusted networks.

Replacement of failed computing and/or networking devices, and configuration of the replacement systems, requires substantial time and effort. During the replacement process, a network or data resource in a trusted network may remain inaccessible. In some cases, computing systems are grouped to ensure data availability and prevent resource "downtime". Typically, such grouped systems are implemented as either redundant, identical systems, or similarly situated systems capable of operating in place of each other to provide similar services.

In the context of gateway devices, redundant systems provide additional locations for data vulnerability, and add a substantial amount of complexity. This is at least in part because redundant gateway devices must coordinate how those devices respond to systems on untrusted networks, and propagate security settings among those devices. Furthermore, to transmit sensitive data (e.g., data from a trusted network) to devices in an untrusted network, point-to-point data protection schemes are typically employed, which are difficult to extend to redundant or similarly situated systems without compromising security.

For these and other reasons, improvements are desirable.

SUMMARY

In accordance with the following disclosure, the above and other problems are addressed by the following:

In a first aspect, a method for assigning communication transaction handling to a gateway is disclosed. The method includes receiving a request for a license from a computing device at a control gateway within a group of gateway devices including a plurality of gateway devices configured to support communication of cryptographically split data. The method also includes assigning communications from the computing device to one of the plurality of gateway devices based on a load balancing algorithm, and routing the communication request to the assigned gateway device.

In a second aspect, a method for handling failover from a failed gateway device in a group including a plurality of gateway devices is disclosed. The method includes determining the existence of a failed gateway device within the group of gateway devices, each of the gateway devices configured to support communication of cryptographically split data. The method further includes determining whether the failed gateway device is a control gateway device for the group of gateway devices. The method also includes, upon determining that the failed device is a control gateway device, assigning a remaining gateway device in the group as a new control gateway device, notifying network resources to communicate with the new control gateway device, and notifying the other remaining gateway devices in the group of the identity of the new control gateway device.

In a third aspect, a system for managing licensing tunnels is disclosed. The system includes a plurality of communicatively interconnected gateway devices configured to support communication of cryptographically split data, the plurality of gateway devices including a control gateway device configured to receive license requests from computing devices and assign communications from the computing devices to one of the plurality of gateway devices based on a load balancing algorithm, the plurality of gateway devices further configured to exchange heartbeat messages.

DETAILED DESCRIPTION

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

In general the present disclosure relates to load balancing and failover across gateway computing devices which support communication of cryptographically split data with "parsed" clients, and other computing devices. The load balancing and failover techniques described in this application allow the gateway computing devices, which can be secure network appliances or other cryptographically-enabled gateway devices. By "parsed" clients it is intended that the client devices can support transmission of cryptographic split data for transmission across network systems to prevent data capture/eavesdropping by systems, thereby providing secure communication with another endpoint. Additionally, in the context of the present application the gateway computing devices provide management of communication tunnels with such parsed clients or other computing devices to allow those clients access to data protected by the gateways, as described in further detail below. By incorporating certain load balancing and failover features into grouped or "teamed" gateway devices, data/resource availability can be improved in combination with the increased security provided by the cryptographic techniques provided by individual gateway systems.

Figure 1:
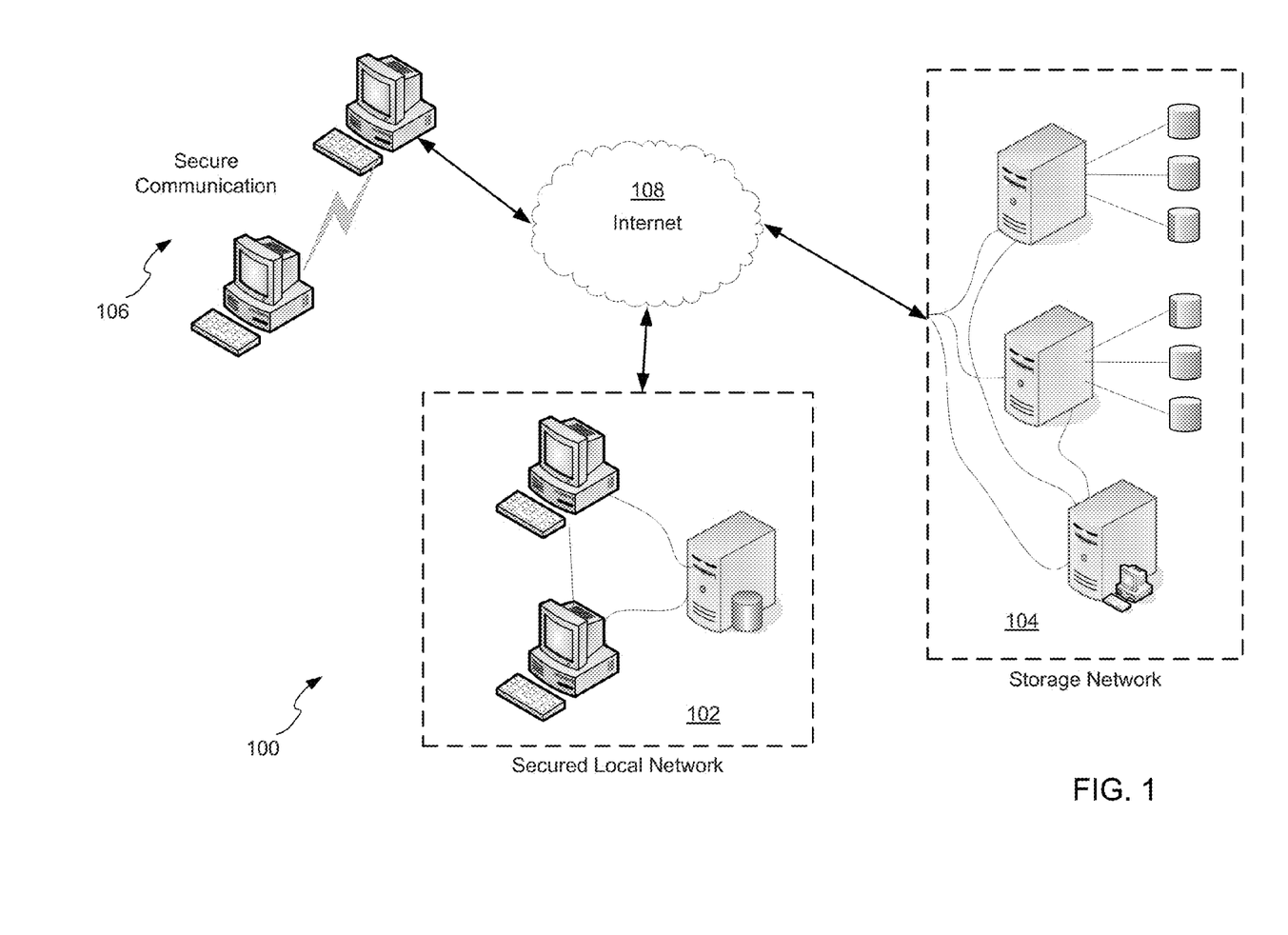
FIG. 1 is a schematic view of a network in which aspects of the present disclosure can be implemented.

FIG. 1 is a schematic view of a network 100 in which aspects of the present disclosure can be implemented. The network 100 represents a number of different example scenarios in which secured access to a computing resource is desired. For example, the network 100 includes a secured local area network 102, a storage network 104, and a secure communication connection 106.

The local area network 102 corresponds to a secured local area network in which data, applications, computing resources, or other computing capabilities can be shared among a number of computers and a number of users. For example, the local area network 102 can be a network within a corporation or otherwise controlled by a single entity, such that access to the network is limited but data access within the network is widely distributed. In such situations, one or more users may require access to certain data, and other users are restricted from access to that data. Or, certain users can have access to computing resources or portions of the network (or a level of access) that other users within the local area network do not have. Other distributions of users in communities of interest within the local area network 102 are possible as well.

In certain embodiments, each of the users in the local area network 102 can communicate using a secure communications arrangement such as those using cryptographic splitting of data across messages transmitted between computers within the network. Example secure communications systems are described in U.S. patent application Ser. Nos. 11/714,598 filed Mar. 6, 2007; 11/982,112 filed Nov. 1, 2007 and the instant case filed herewith, the disclosures of which are hereby incorporated by reference in their entireties.

The storage network 104 includes a number of data storage devices (e.g. databases or data storage devices) configured to store data accessible to a number of users. In the context of the storage network, different users can be allowed access to different sets of data, or different views of a given set of data. Alternately, different users or groups of users can be allowed different access levels to the data. In certain embodiments, the storage network 104 can be secured within a trusted network, using cryptographic splitting to store data across volumes, to improve security and data availability. Example cryptographic splitting architectures useable in such a storage area network are described in U.S. patent application Ser. No. 12/342,636; U.S. patent application Ser. No. 12/342,575; and U.S. patent application Ser. No. 12/342,610 each filed on Dec. 23, 2008 and entitled "STORAGE COMMUNITIES OF INTEREST USING CRYPTOGRAPHIC SPLITTING", the disclosures of which are hereby incorporated by reference in their entireties. Other example cryptographic splitting architectures/features are described in U.S. patent application Ser. No. 12/336,559; U.S. patent application Ser. No. 12/336,562; and U.S. patent application Ser. No. 12/336,564 each filed on Dec. 17, 2008 and entitled "STORAGE SECURITY USING CRYPTOGRAPHIC SPLITTING", the disclosures of which are hereby incorporated by reference in their entireties.

The secure communication connection 106 includes a direct secure communication connection between two or more computing systems. In such an arrangement, a user of one of the computing systems may be provided dedicated and/or secure access to a port or some other portion of the complementary computing system. That access right can be provided to that user (and other users having access to that computer) based on the user's identity and access to a workgroup key used to protect communicative access to the remote computer, in an analogous manner to that described in the local area network 102, above. In certain embodiments, the secure communication connection can be provided using SecureParser cryptographic splitting software provided by Security First Corporation of Rancho Santa Margarita, Calif.

In the embodiment shown, the secured local area network 102, storage network 104, and secure communication connection 106 are interconnected via an unsecured connection, illustrated as the Internet 108. Although any of a variety of networks can be used, it is intended that the Internet 108 represent unsecured communication channels between computing systems, such that data or other resources must be individually secured prior to transmission on such a network. Such security over an open network such as Internet 108 can be accomplished using cryptographic splitting techniques as well.

Figure 2:
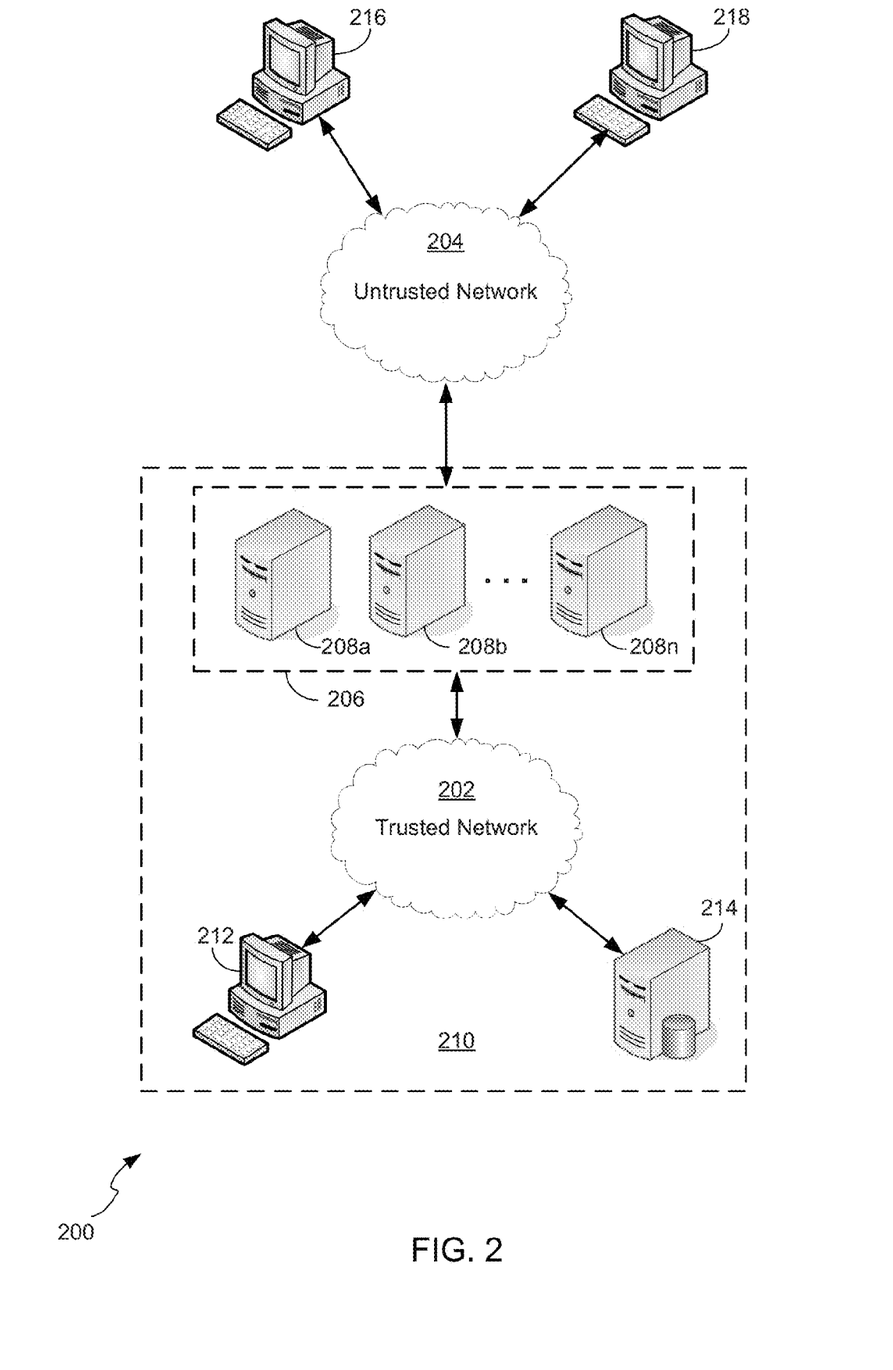
FIG. 2 is a schematic view of portions of a network in which aspects of the present disclosure can be implemented.

FIG. 2 is a schematic view of an example network 200 including a plurality of gateway devices incorporated into a "team" or group of cooperating devices. The network 200 generally includes a trusted network 202 and an untrusted network 204, separated by a group 206 of gateway devices (shown as gateway devices 208a-n). The trusted network 202, in the embodiment shown, is disposed at a location 210, e.g., a home, place of business, data center, or other isolated network (e.g., a LAN, SAN, or other network). In the embodiment shown, the trusted network 202 connects various types of computing devices, such as a computing system 212 and file server 214 as shown. Other computing devices could be connected by the trusted network 202 as well.

The untrusted network 204 can be any of a number of widely available, unsecured networks in which data communications can take place. In various embodiments, the untrusted network 204 can be a LAN, SAN, WAN, Internet, or other data connection network. In the embodiment shown, various computing devices 216, 218 can be connected to the untrusted network 204, and can be any of a number of types of computing devices, such as described in conjunction with FIG. 5, below.

In comparing trusted network 202 and untrusted network 204, it is noted that, due to the fact that the trusted network 202 is secure (i.e., isolated from unknown external observation), the trusted network can exchange data among the devices connected directly thereto (e.g., computing system 212 and file server 214) in clear text form. In contrast, untrusted network 204 must include some type of data encryption to prevent eavesdropping or other data stealing operation from taking place.

In the embodiment shown, the group 206 of gateway devices 208a-n connect the trusted network 202 and the untrusted network 204, and provide a means for communicating between the trusted and untrusted networks. Each of the gateway devices is capable of communicating via the clear text of the trusted network 202, while providing security for communications in the untrusted network 204. In certain embodiments, each of the gateway devices 208a-n is capable of splitting and encrypting data passed from the trusted network 202 to the untrusted network 204, for decryption by a trusted client containing software capable of decoding the split and encrypted data. Similarly, each of the gateway devices 208a-n can reconstitute previously split and encrypted data received on the untrusted network (i.e., from a parsed client or other computing device capable of cryptographically splitting data) to transmit data on the trusted network 202. The gateway devices 208a-n therefore provide an open "tunnel" for secure communication for parsed clients or other computing devices on an unsecured network 204 to access and communicate with devices on the secured network 202.

Figure 3:
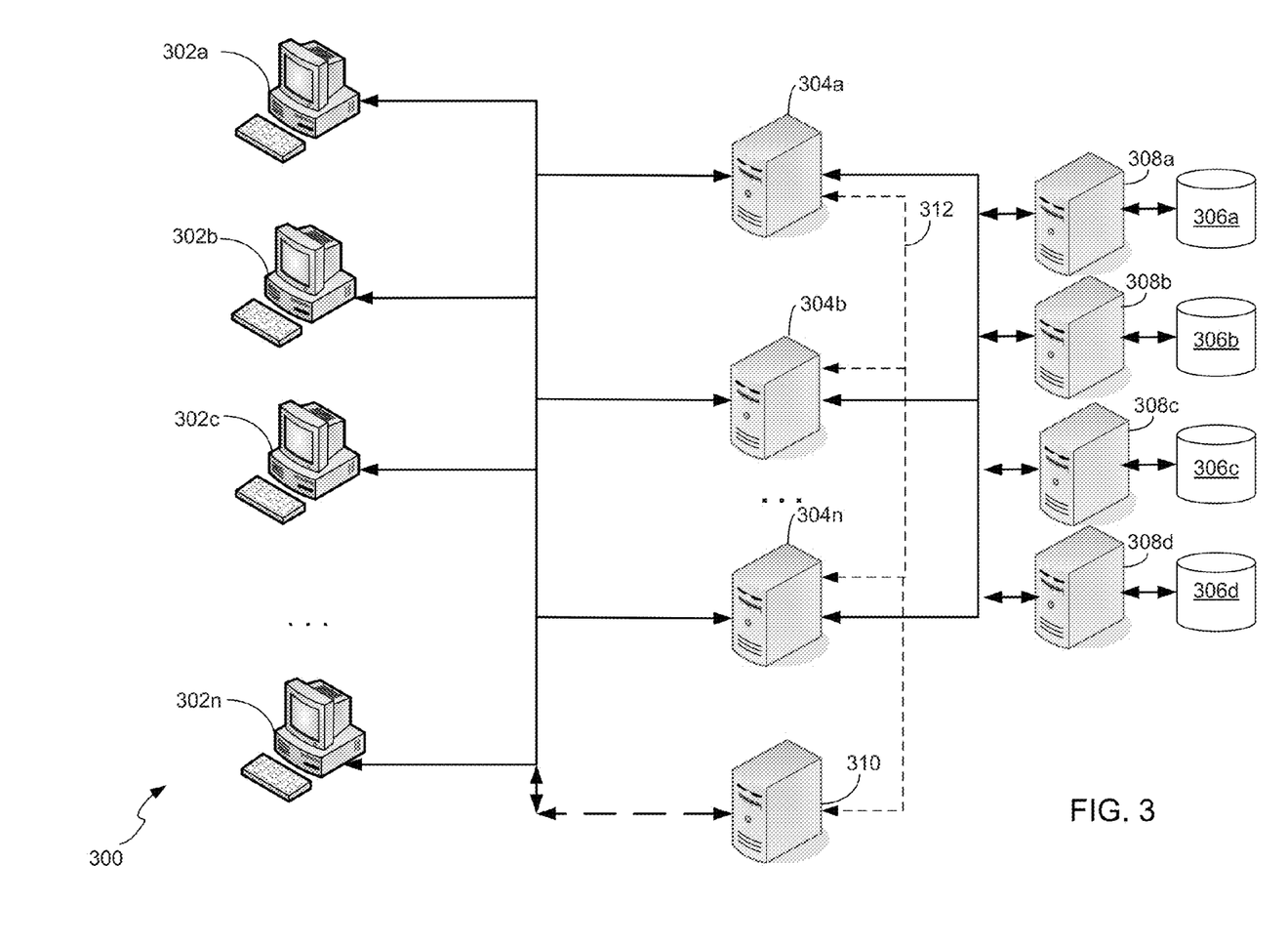
FIG. 3 is a schematic view of a secured network, according to one possible embodiment of the present disclosure.

The group 206 of gateway devices 208a-n can be formed in any of a number of ways. For example, in certain embodiments, the gateway devices can be grouped using an administrative utility operable on a gateway device or other computing system (e.g., an administrative system communicatively connected to the gateway devices, such as in the trusted network 202 or connected directly to the gateway devices as illustrated in FIG. 3, below). In such embodiments, the grouping of gateway devices can be defined by associating IP addresses, port addresses, or other device-specific identifier with a common one or more workgroup keys used by the gateway devices and able to be issued to a parsed client or other computing device under license for communication with the gateway devices.

Additionally, the grouping can be defined by including a common address, such as a common IP address, for the group. In the embodiment shown, parsed clients (e.g. client devices 216, 218) transmitting data to systems in the trusted network 202 will have that data routed through the common address, and then managed by one of the grouped gateway devices 208a-n. The gateway devices 208a-n can be assigned to respond to data received from one or more particular parsed clients or other devices, as described in further detail below. In certain embodiments, a control gateway device can be designated, and performs load-balancing operations to assign the parsed client to one of the gateway devices. Details regarding example methods for assigning a parsed client to a gateway device are provided below in conjunction with FIGS. 4A-4B and 8.

Further, the gateway devices 208a-n are communicatively interconnected and interchangeable, such that failure of one of the gateway devices in the group 206 will not interrupt communication between a parsed client assigned to a failed gateway device. Additional details regarding example methods for handling failure of a gateway device in a group of devices are provided below in conjunction with FIGS. 4A-4B, 7, and 9.

FIG. 3 is a schematic view of an example secured network 300 implemented as a storage area network, according to a possible embodiment of the present disclosure. The secured network 300 can represent any of a number of networks having accessible computing resources, such as the network 104 of FIG. 1 or any of the other subnetworks described therein. The network 300 therefore can represent a portion of network 200 including the trusted network 202 and secured portions of the untrusted network 204.

In the embodiment shown, the network 300 includes a plurality of parsed clients 302a-n, each of which corresponds to one or more computing systems defined to be included within a group having rights to systems/resources within the network and accessible via gateway devices. A number of computing resources are available to the parsed clients 302a-n in the example secured network 300 via gateway devices 304a-n, including data storage 306a-d and computing devices 308a-d. A key server 310 manages access to the computing resources by managing users in one or more communities of interest, and management of keys used by the gateway devices 304a-n. In general, the key server 310 maintains a directory of users and a directory defining one or more groups of gateway devices, and can provide to each user one or more workgroup keys. The key server 310 securely stores copies of workgroup keys specific to different communities of interest and different gateway groups.

In the embodiment shown, the gateway devices 304a-n can communicate with each other and with the key server 310 in any of a number of different ways. In the embodiment shown, a sideband messaging network 312 allows control messages to be communicated among the gateway devices 304a-n and with the key server 310. In alternative embodiments, the gateway devices 304a-n and key server 310 can communicate using existing communicative/network connections, and can maintain security in transmitting keys and status messages therebetween by using cryptographic splitting operations during transmission of those messages, similar to the manner described for untrusted networks as described herein.

The gateway devices 304a-n can be placed into any of a number of different combinations of groups, as described above with respect to FIG. 2. Membership in any of the groups is controlled using encryption keys provided by the key server 310. For example, a first group could encompass only one gateway device 304a, and a second group could encompass the remaining gateway devices 304b-n. Other arrangements are possible as well.

Depending on the number of gateway devices included into a group, that group can have associated therewith a predetermined number of licenses. For example, each gateway device could be configured, via key server 310, to support up to 400 licenses (e.g., based on predetermined capabilities of the gateway device to support connection and cryptographic operations based on expected message bandwidth for licensed client devices). When grouped, a particular group of gateway devices could therefore support a greater number of licenses than a single gateway device. Examples of licensing and load balancing using a number of gateway devices are provided below in conjunction with FIGS. 4A-4B.

Figure 4A:
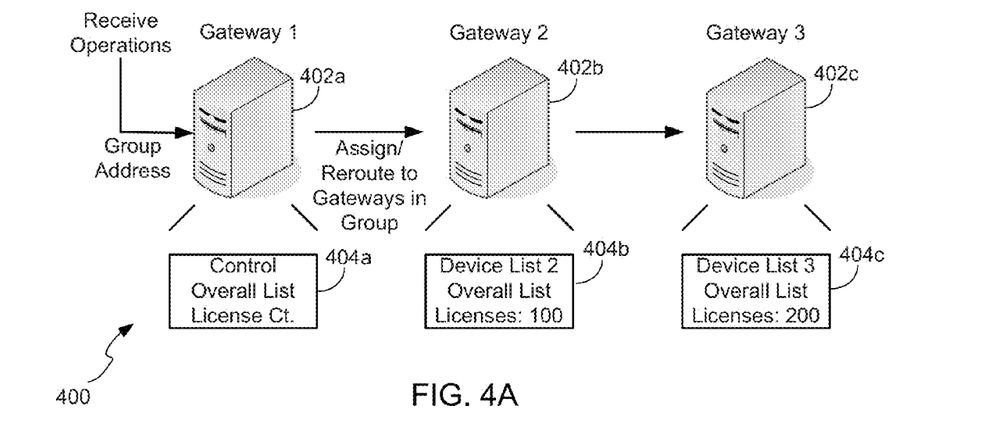
FIGS. 4A-4B illustrate load balancing and failover across an example group of gateway devices useable within the networks of FIGS. 1-3.
Figure 4B:
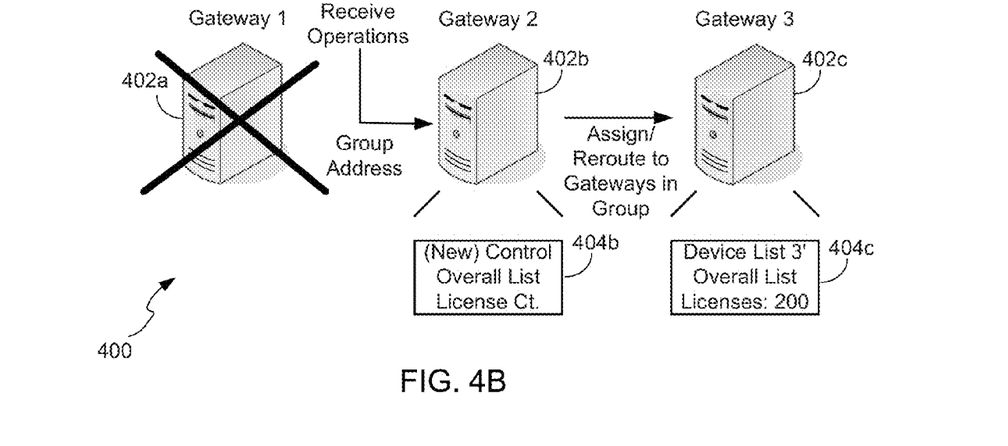

FIGS. 4A-4B illustrate both load balancing and failover across an example group 400 of three gateway devices 402a-c useable within the networks of FIGS. 1-3. Although three gateway devices are displayed in these figures, it is understood that additional or fewer gateway devices could be included in a group.

FIG. 4A illustrates load balancing operations within the group 400 of gateway devices 402a-c. Each of the gateway devices 402a-c has a unique address (e.g., IP address), and the group 400 has a common address as well. In certain embodiments, the common address of the group corresponds to the address of a control gateway device, which at least initially receives and determines routing of data requests from a parsed client or other computing device. In the embodiment shown, gateway device 402a operates as a control gateway.

Each of the gateway devices 402a-c maintains a table (i.e. within gateway information 404a-c respectively) including information about received messages from parsed clients or other computing devices. The gateway devices 402a-c therefore can each track communications from each device and determine which gateway device handled tunnel opening and management for that device in case of failure of a gateway device (as illustrated in FIG. 4B, below).

To ensure that the control gateway (e.g., gateway 402a) initially handles messages from a parsed client or other device, the group address is set to resolve to the physical address (e.g., the MAC address) of the control gateway (e.g., via ARP). When the device accesses the group 400 using a data request (e.g., logs on to the gateway group for access to network resources, only control gateway 402a responds, and other gateways 402b-c ignore the request but update their table of received messages. The parsed client can then transmit its request for a license and open tunnel to the control gateway 402a (e.g., via an INIT-type tunnel and license request sequence).

The control gateway 402a will determine whether the request is previously associated with a gateway. If there is such an assignment, the control gateway 402a updates the parsed client or other computing device so that the device can communicate directly with the assigned gateway. If there is no such assignment (e.g., if the request is not present in a table), and assuming that there exists another gateway with an available license, a tunnel should be opened. The control gateway 402 will therefore either handle the request (e.g., in the case the control gateway is the only gateway present) or will return an indication of a gateway to use for the request to the parsed client including an address of the assigned gateway for use.

To determine which of the other gateways to assign to handle licensing and opening a tunnel, the control gateway 402a performs a load balancing operation to determine which other gateway 402b-c should handle the received request. The control gateway 402a can perform a load balancing operation in any of a number of different ways. In general, the control gateway 402a can be configured to assign new parsed clients or other devices communicating with the group 400 to a least-loaded gateway within the group. This can be determined from any of: remaining licenses available for each gateway, total licenses used for each gateway, or other metrics. In certain embodiments, the control gateway 402a will not manage connections with parsed clients; therefore the overall total number of licenses available will typically correspond to the number of licenses supported by the non-control gateways within the group 400. In the embodiment shown, gateway 402b supports 100 licenses, and gateway 402c supports 200 licenses (resulting in a total of 300 licenses). Each gateway can be determined to support either the same or a different number of license devices. Once assigned and associated with the parsed client, the assigned gateway can transmit a message to the other gateway devices within the group (e.g., via the heartbeat messages discussed herein) to notify those other gateway devices of the successful assignment to that device. The remaining devices update their tables to reflect the assignment.

In the embodiment shown, the three gateway devices 402a-c are communicatively connected, and periodically pass heartbeat messages therebetween to verify that each of the other gateway devices remains operational. The heartbeat messages perform a number of functions, and can include any of a number of pieces of information about the operational status of the gateway device. In certain embodiments, the heartbeat message provides an indication that the gateway is available to join a group of gateway devices. In other embodiments, the heartbeat message can convey other operational or status information. The heartbeat message, in such embodiments, can include a group identifier, the license capacity for the gateway, current license usage for the gateway, the gateway's local group identifier, and the gateway's physical address. This information can be used by another gateway (e.g., the control gateway) to determine capacity of the gateway to accept additional license tunnels and/or to determine the continued operation of the gateway. Additionally, the control gateway 402a can transmit other group information, such as overall number of used or available licenses, or other variables.

Referring now to FIG. 4B, failover is discussed within the group 400 of gateway devices 402a-c. In the embodiment shown, control gateway 402a is illustrated as the failing gateway device; however, other gateway devices could fail and cause analogous response.

Typically, failover occurs in two circumstances. First, a gateway device may need to shut down, but is still capable of communication. In this situation, the control gateway 402a and other active gateways remove the appliance as able to claim any table entries for communication with a device, and the failed gateway's license capacity (and current number used) are removed from the list for the group. If, in this situation, the gateway device is the control gateway device 402a, it will designate another device (typically a least-utilized device) as the new control gateway device.

Second, a gateway device may suddenly halt operation. In this situation, the failed gateway is detected by way of non-receipt of a heartbeat message within a predetermined heartbeat interval, which is a set amount of time in which a heartbeat message is expected to be received from each of the other gateway devices 402a-c in the group 400. If a non-control gateway fails suddenly, the remaining gateway devices operate similarly to the shutdown operation described above, removing the failed gateway's license capacity and list of devices, thereby updating the status of the group 400. If the nonfailed gateway devices 402b-c do not receive a heartbeat message from control gateway device 402a within the heartbeat interval, they will assume that the control gateway device 402a has failed or is unavailable, and those remaining devices must determine which is to become a new control gateway device (in the embodiment shown, gateway device 402b becomes the new control gateway device).

Additionally, and regardless of the manner in which a gateway device fails, various additional operations occur to handle failure of the control gateway 402a. One of the remaining gateways (in the embodiment shown, gateway 402b) will send a heartbeat message notifying other gateways (e.g., gateway 402c) of its updated status as the new control gateway. The new control gateway 402b will also cause clients to refresh their addresses to the group 400, such that the clients addressing the group now will send data requests to the new control gateway for handling/management.

Although in the embodiment shown, the control gateway device 402a has failed, it is understood that the same general principles apply to failure of one of the other gateway devices 402b-c. In the case of a failure of one of these devices, the list of parsed clients and other devices associated with that device is vacated, and subsequent communications from those clients to the group address are reassigned by the control gateway. In certain embodiments, the updating of group status can be delayed by a predetermined amount of time to allow the failed gateway a chance to restart and rejoin the group 400.

Figure 5:
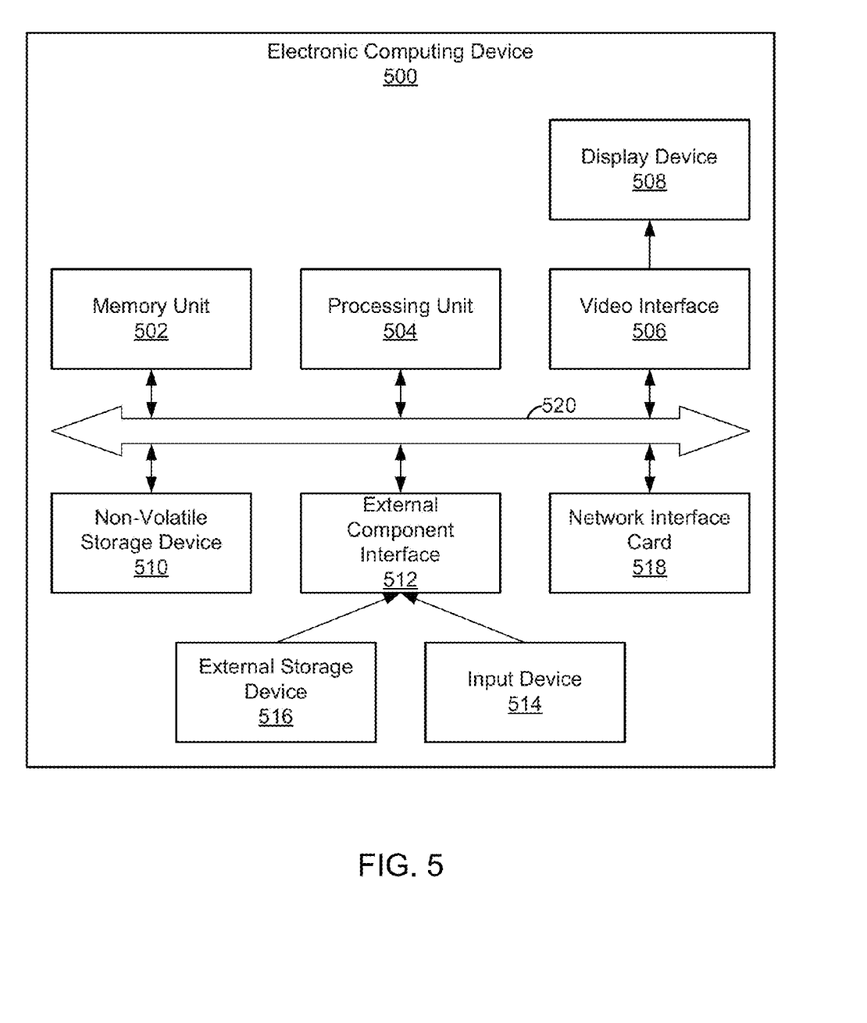
FIG. 5 is a block diagram illustrating example physical components of an electronic computing device.

FIG. 5 is a block diagram illustrating example physical components of an electronic computing device 500. The electronic computing device is useable as any of the parsed clients, gateway devices, or other computing systems of the present disclosure. A computing device, such as electronic computing device 500, typically includes at least some form of computer-readable media. Computer readable media can be any available media that can be accessed by the electronic computing device 500. By way of example, and not limitation, computer-readable media might comprise computer storage media and communication media.

As illustrated in the example of FIG. 5, electronic computing device 500 comprises a memory unit 502. Memory unit 502 is a computer-readable data storage medium capable of storing data and/or instructions. Memory unit 502 may be a variety of different types of computer-readable storage media including, but not limited to, dynamic random access memory (DRAM), double data rate synchronous dynamic random access memory (DDR SDRAM), reduced latency DRAM, DDR2 SDRAM, DDR3 SDRAM, Rambus RAM, or other types of computer-readable storage media.

In addition, electronic computing device 500 comprises a processing unit 504. As mentioned above, a processing unit is a set of one or more physical electronic integrated circuits that are capable of executing instructions. In a first example, processing unit 504 may execute software instructions that cause electronic computing device 500 to provide specific functionality. In this first example, processing unit 504 may be implemented as one or more processing cores and/or as one or more separate microprocessors. For instance, in this first example, processing unit 504 may be implemented as one or more Intel Core 2 microprocessors. Processing unit 504 may be capable of executing instructions in an instruction set, such as the x86 instruction set, the POWER instruction set, a RISC instruction set, the SPARC instruction set, the IA-64 instruction set, the MIPS instruction set, or another instruction set. In a second example, processing unit 504 may be implemented as an ASIC that provides specific functionality. In a third example, processing unit 504 may provide specific functionality by using an ASIC and by executing software instructions.

Electronic computing device 500 also comprises a video interface 506. Video interface 506 enables electronic computing device 500 to output video information to a display device 508. Display device 508 may be a variety of different types of display devices. For instance, display device 508 may be a cathode-ray tube display, an LCD display panel, a plasma screen display panel, a touch-sensitive display panel, a LED array, or another type of display device.

In addition, electronic computing device 500 includes a non-volatile storage device 510. Non-volatile storage device 510 is a computer-readable data storage medium that is capable of storing data and/or instructions. Non-volatile storage device 510 may be a variety of different types of non-volatile storage devices. For example, non-volatile storage device 510 may be one or more hard disk drives, magnetic tape drives, CD-ROM drives, DVD-ROM drives, Blu-Ray disc drives, or other types of non-volatile storage devices.

Electronic computing device 500 also includes an external component interface 512 that enables electronic computing device 500 to communicate with external components. As illustrated in the example of FIG. 5, external component interface 512 enables electronic computing device 500 to communicate with an input device 514 and an external storage device 516. In one implementation of electronic computing device 500, external component interface 512 is a Universal Serial Bus (USB) interface. In other implementations of electronic computing device 500, electronic computing device 500 may include another type of interface that enables electronic computing device 500 to communicate with input devices and/or output devices. For instance, electronic computing device 500 may include a PS/2 interface. Input device 514 may be a variety of different types of devices including, but not limited to, keyboards, mice, trackballs, stylus input devices, touch pads, touch-sensitive display screens, or other types of input devices. External storage device 516 may be a variety of different types of computer-readable data storage media including magnetic tape, flash memory modules, magnetic disk drives, optical disc drives, and other computer-readable data storage media.

In the context of the electronic computing device 500, computer storage media includes volatile and nonvolatile, removable and non-removable media implemented in any method or technology for storage of information such as computer readable instructions, data structures, program modules or other data. Computer storage media includes, but is not limited to, various memory technologies listed above regarding memory unit 502, non-volatile storage device 510, or external storage device 516, as well as other RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by the electronic computing device 500.

In addition, electronic computing device 500 includes a network interface card 518 that enables electronic computing device 500 to send data to and receive data from an electronic communication network. Network interface card 518 may be a variety of different types of network interface. For example, network interface card 518 may be an Ethernet interface, a token-ring network interface, a fiber optic network interface, a wireless network interface (e.g., WiFi, WiMax, etc.), or another type of network interface.

Electronic computing device 500 also includes a communications medium 520. Communications medium 520 facilitates communication among the various components of electronic computing device 500. Communications medium 520 may comprise one or more different types of communications media including, but not limited to, a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computer System Interface (SCSI) interface, or another type of communications medium.

Communication media, such as communications medium 520, typically embodies computer-readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

Electronic computing device 500 includes several computer-readable data storage media (i.e., memory unit 502, non-volatile storage device 510, and external storage device 516). Together, these computer-readable storage media may constitute a single data storage system. As discussed above, a data storage system is a set of one or more computer-readable data storage mediums. This data storage system may store instructions executable by processing unit 504. Activities described in the above description may result from the execution of the instructions stored on this data storage system. Thus, when this description says that a particular logical module performs a particular activity, such a statement may be interpreted to mean that instructions of the logical module, when executed by processing unit 504, cause electronic computing device 500 to perform the activity. In other words, when this description says that a particular logical module performs a particular activity, a reader may interpret such a statement to mean that the instructions configure electronic computing device 500 such that electronic computing device 500 performs the particular activity.

One of ordinary skill in the art will recognize that additional components, peripheral devices, communications interconnections and similar additional functionality may also be included within the electronic computing device 500 without departing from the spirit and scope of the present invention as recited within the attached claims.

Now referring to FIGS. 6-9, methods are discussed that can be implemented using the networks and devices of FIGS. 1-5, above, to manage communication with parsed clients. The methods of FIGS. 6-9 generally relate to formation of a group of gateway devices and allocation of operations among those gateway devices both during normal operation and in case of device failure.

Figure 6:
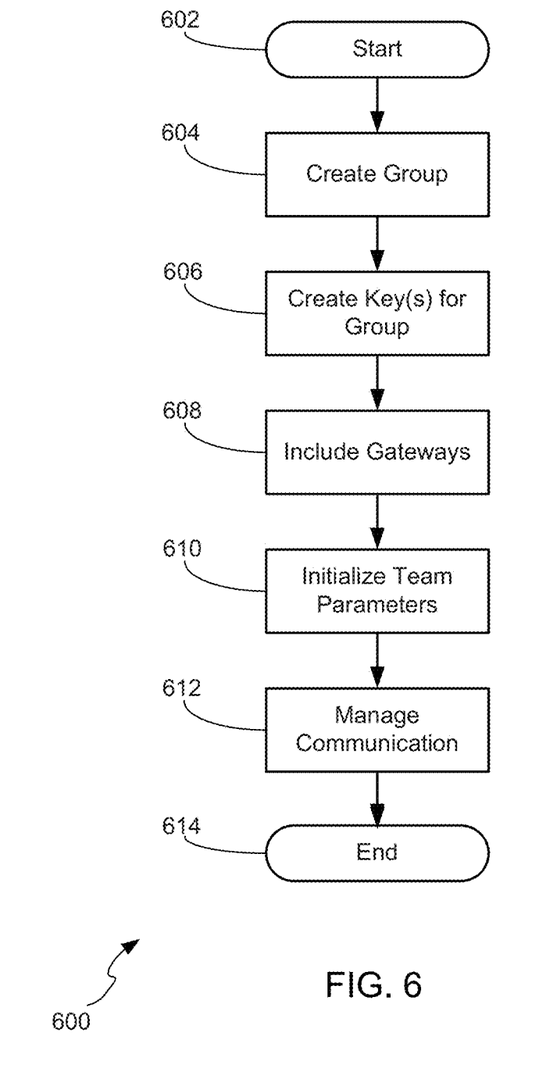
FIG. 6 is a flowchart of a method for forming a group of gateway devices for management of communication with computing devices, according to a possible embodiment of the present disclosure.

FIG. 6 is a flowchart of a method 600 for forming a group of gateway devices for management of communication with parsed clients and other computing devices, according to a possible embodiment of the present disclosure. The method 600 can be used to associate gateway devices into a group, and subsequent operation of those gateways. The method is instantiated at a start operation 602, which corresponds to initialization of one or more gateway devices in a network, such as those shown above in FIGS. 1-3.

A create group module 604 forms a group in an administrative tool of a computing system, such as one of the gateway devices or a key server as described in conjunction with FIGS. 2-3. The administrative tool can, in certain embodiments, provide a graphical user interface for assigning parameters such as the group members, group address, license limits, keys used by the group, or other features. A create keys module 606 allows creation of one or more cryptographic keys that can be stored at the gateway(s) and/or key server, which are used to share membership in the group (i.e., individual gateways having access to the keys can understand messages from the other gateways, using the cryptographic splitting and reconstitution techniques provided). The create keys module 606 can also be executed via use of the administrative tool described above. A gateway inclusion module 608 allows a user to add gateways to a group by assigning the created keys to the gateways, again via an administrative tool. A parameters module 610 allows assignment of group-specific parameters to each of the gateways within a group, such as the team address, individual addresses, the identity of a control gateway, number of licenses per group and per gateway, heartbeat message periods and default settings. Other parameters can be set as well.

A communication module 612 corresponds to allowing initial communication of data from the group of gateway devices with one or more parsed clients or other computing devices. Typically, such communication is enabled after the group of gateway devices has been formed. The communication module 612 can, in certain embodiments, correspond to operation of the method 700 of FIG. 7, below. The method is completed at end operation 614.

Using analogous arrangements, a gateway device can be added to a preexisting group, e.g., using the administrative tool described above. Each time a gateway is added to a preexisting group, that gateway can broadcast its identity as part of the group. The control gateway, and other gateways existing within the group, update their groupwide information, including the total number of available licenses and total licenses, the number of group gateway devices, and tables indicating assignment of parsed clients.

Figure 7:
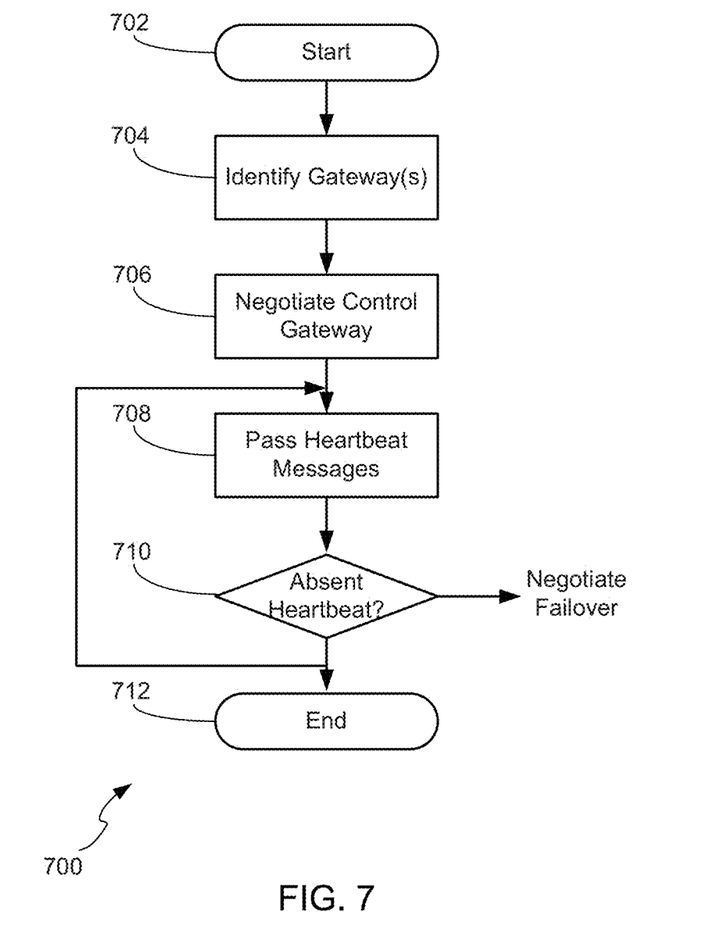
FIG. 7 is a flowchart of a method for initializing and forming a group of gateway devices, according to a possible embodiment of the present disclosure.

FIG. 7 is a flowchart of a method 700 for operation of a gateway device within a group of gateway devices, according to a possible embodiment of the present disclosure. The method 700 corresponds to generalized operation of a device after it has been included in a group that has been defined using a method such as the example of FIG. 6. The method 700 is instantiated at a start operation 702 which corresponds to enabling connections to the gateway device for remote clients on unsecured networks (e.g., allowing connections to parsed clients or other computing devices).

An identification module 704 identifies each of the gateways to the network in which they reside, such that the gateways are addressable to external systems and can route data between parsed clients, or from parsed to unparsed systems. A negotiation module 706 determines the control gateway within the group of gateway devices, and corresponds to transmission to other gateways of an indication of the control gateway. The control gateway can be initialized according to any of a number of different methodologies; in certain embodiments, the control gateway (e.g., gateway 402a of FIG. 4A) can be the gateway first included within the group, or the least-burdened gateway (to reduce the need for reassignment of devices to gateways); other control gateway selection criteria could be used as well.

A heartbeat module 708 corresponds to initial transmission of periodic heartbeat messages from a gateway device to other gateway devices within the group. The heartbeat module 708 can include cryptographic splitting of the heartbeat message so that only other gateway devices within the group can reconstitute the message, e.g., if heartbeat messages are transmitted over public or shared networks as described above. A heartbeat detection module 710 detects heartbeat messages from the other gateway devices within the group. The heartbeat detection module 710 can also reconsititute cryptographically split heartbeat messages, as necessary, depending upon the implementation of those messages. If all expected heartbeat messages are received by the gateway device (e.g., especially if the gateway device is the control gateway device), operational flow returns to the heartbeat module for periodic transmission and detection of heartbeat messages.

If, on the other hand, a heartbeat message is not received by the gateway, operational flow can exit the method 700, and failure of the gateway device is processed using failover techniques such as those described above in connection with FIG. 4B, and below as related to FIG. 9. An end operation 712 corresponds to completed operation of the method (e.g., shutdown of the gateway device).

During operation of the heartbeat module 708 and the heartbeat detection module 710, the gateway group can concurrently receive and handle data requests from parsed clients or other devices, and can support licensing and opening of tunnels for such devices to access data on other parsed or unparsed systems accessed via the gateway group. Additionally, gateways can use heartbeat messages to join or exit the gateway group, or communicate status information regarding licensing or other updates.

Figure 8:
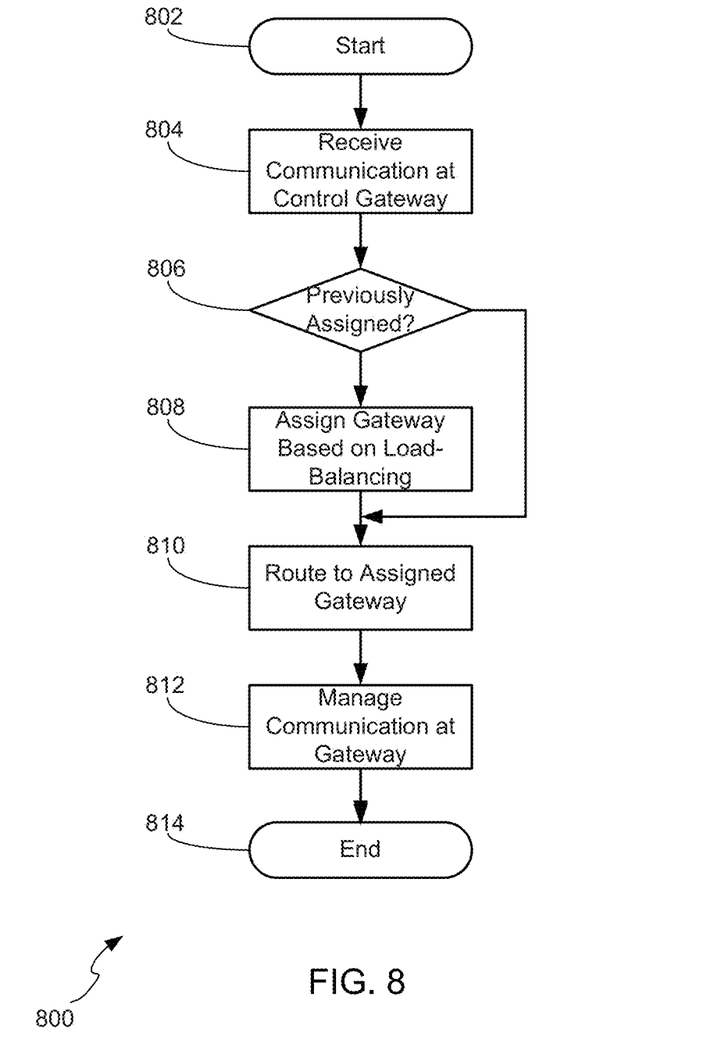
FIG. 8 is a flowchart of a method for management of communication with computing devices using a load-balancing algorithm, according to a possible embodiment of the present disclosure.

FIG. 8 is a flowchart of a method 800 for management of communication with parsed clients using a load-balancing algorithm, according to a possible embodiment of the present disclosure. The method 800 for management of parsed clients corresponds to operation of a group of gateway devices coordinating communication with computing devices in a network, such as the networks of FIGS. 1-3. The method 800 is instantiated at a start operation 802, which corresponds to initial connection of communication between a parsed client or other computing device and a group of gateways, such as a license tunnel request.

A receipt module 804 receives a communication (e.g., a request to open a license tunnel) at a group of gateways. The receipt module 804 routes that communication to the control gateway in the group of gateways, and identifies the device from which it came. An assignment determination module 806 determines whether the device was previously assigned to a particular gateway.

If the device was not previously assigned to a gateway, operational flow proceeds to a load balancing module 808. The load balancing module 808 performs a load balancing algorithm at the control gateway to determine which of the non-control gateways within the group to associate with the device. As previously described, the load balancing module can account for a number of factors, such as the number of available licenses at each gateway, the total number of available licenses, or other factors. In certain embodiments, the load balancing module 808 assigns the parsed client to a least-laden gateway, which can be determined using the number of currently used licenses, available licenses, and total licenses as tracked using the heartbeat messages as previously described.

If the parsed client or other device was previously assigned to a gateway, or once the load balancing module 808 assigns the device to a gateway, operational flow proceeds to a routing module 810. The routing module 810 associates the assigned gateway with the device, and, if necessary, updates lists or tables managed by the gateway devices that track assignments (e.g., license tunnels) for each gateway. A communication management module 812 supports communication with the parsed client or other device at the gateway, for example by updating the address to be used by the device to allow it to directly address the assigned gateway within the group. An end operation 814 corresponds to completion of the load balancing operation for a received license request at the group of gateways.

Figure 9:
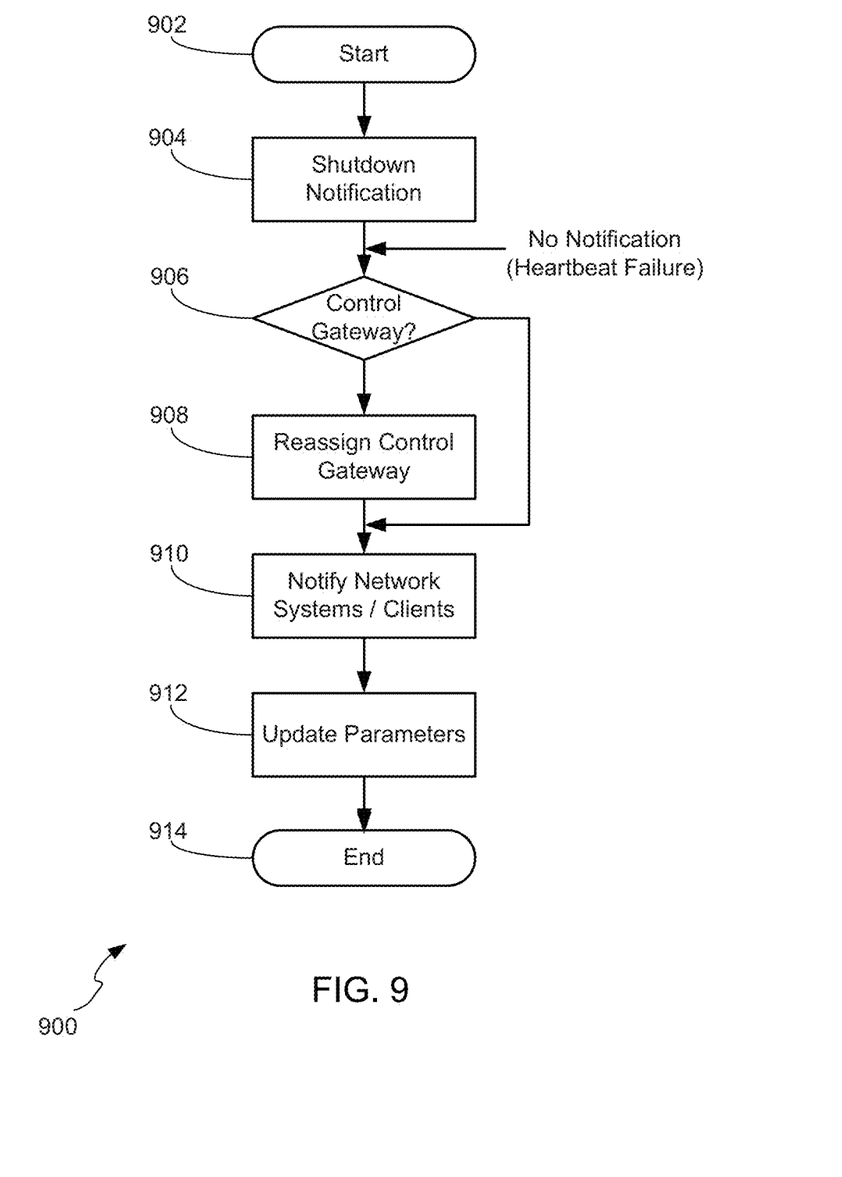
FIG. 9 is a flowchart of a method for detection and management of resources in case of a failed gateway device in a group of gateway devices, according to a possible embodiment of the present disclosure.

FIG. 9 is a flowchart of a method 900 for detection and management of resources in case of a failed gateway device in a group of gateway devices, according to a possible embodiment of the present disclosure. The method 900 illustrates operation within a group of gateway devices to reallocate parsed clients or other computing devices among remaining gateway devices in the instance a gateway device fails, such as is discussed above with respect to FIG. 4B. The method 900 is instantiated at a start operation 902, which corresponds generally with initial failure detection within a gateway device located within a group of gateway devices.

A shutdown notification module 904 corresponds to a gateway device shutting down, for example due to an error or other problem that does not cause immediate failure (i.e., the gateway device can self diagnose and can send a message notifying other gateway devices of the error). The shutdown notification module 904 relates to transmission of a shutdown message from a failed gateway device, and receipt of that message at the remaining gateway devices.

As an alternative to the shutdown notification module 904, the method 900 for failover can also be instantiated in the case of nonreceipt of a heartbeat message. This can occur due to unexpected shutdown of a gateway device, as referenced in FIG. 7, above. In the case of nonreceipt of a heartbeat message, shutdown operations are performed by the remaining gateway devices, while in the case of a shutdown in which the shutdown notification module 904 operates, some portion of the failover operations can be performed by the failing gateway device.

A control gateway operation 906 determines whether the failed gateway device is a control gateway device. If the failed gateway device is a control gateway device, a new control gateway must be assigned, either by the current control gateway (e.g., in the instance that the control gateway can notify other gateways of its shutdown) or by the other gateway devices (e.g., in the instance that the failure is sudden and the control gateway cannot send a shutdown message to the other gateway devices within the group). If the failed gateway is a control gateway, a reassign module 908 reassigns a remaining gateway device to be a new control gateway (e.g., gateway 402b in FIGS. 4A-4B).

A notification module 910 notifies network systems and clients of the failure of the gateway device, for example by requesting that each client associated with either the failed gateway or the group to refresh their network/group addresses, such that the group (and new control gateway) can rebalance the assignments of parsed clients seeking access to resources through the group of gateway devices.

A parameter update module 912 updates various parameters tracked by the non-failed gateway devices in the group. These parameters can include the number of licenses available from the group, the license assignments and lists of license assignments (e.g., identities of parsed clients or other devices), the group address, and other parameters. Additionally, in the case that the failed gateway is a control gateway, the parameter update module 912 can correspond to the new control gateway notifying the other remaining gateways of its role. An end operation 914 corresponds to completed failover and reallocation of communications among the remaining, nonfailing gateway devices.

Overall, using the methods of FIGS. 6-9, it can be seen that substantially continuous operation of gateway devices can be accomplished in a network incorporating cryptographic splitting and license tunnel management for parsed clients. Other advantages arise as well.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A non-transitory computer readable medium containing encoded, non-transient data representing instructions for a programmable computing system that when read and executed by the computing system implements a method for assigning communication transaction handling to a gateway, the method comprising:

receiving a request for a license from a computing device at a control gateway within a group of gateway devices including a plurality of gateway devices configured to support communication of cryptographically split data;

assigning communications from the computing device to one of the plurality of gateway devices based on a load balancing algorithm; and routing the communication request to the assigned gateway device;

wherein the cryptographically splitting data utilize a plurality of encryption keys to create a plurality of separate community of interest data sets in which the primary write requests and corresponding plurality of secondary write request are members of the community of interest associated with the one of the plurality of encryption keys used in the write requests.

2. The non-transitory computer readable medium of claim 1, wherein, prior to assigning communications with the source, none of the plurality of gateway devices are assigned to handle communications from the computing device.

3. The non-transitory computer readable medium of claim 1, further comprising associating a plurality of gateway devices in the group using a workgroup key.

4. The non-transitory computer readable medium of claim 1, further comprising defining one of the plurality of gateway devices as a control gateway device.

5. The non-transitory computer readable medium of claim 1, wherein each of the plurality of gateway devices is a secure network appliance.

6. The non-transitory computer readable medium of claim 1, wherein the group of gateway devices provides to the computing device controlled access to a trusted network.

7. The non-transitory computer readable medium of claim 1, further comprising periodically transmitting a heartbeat message to the other gateway devices in the group.

8. The non-transitory computer readable medium of claim 7, further comprising receiving heartbeat messages from the other gateway devices in the group.

9. The non-transitory computer readable medium of claim 1, further comprising granting a license to the computing device from among a predetermined number of licenses available from the group of gateway devices.

10. The non-transitory computer readable medium of claim 1, wherein receiving a communication request from a computing device at a control gateway comprises receiving a communication request addressed to a group address, wherein the group address is associated with an address assigned to the control gateway device.

11. The non-transitory computer readable medium of claim 1, wherein assigning communications from the computing device to one of the plurality of gateway devices based on a load balancing algorithm includes assigning communications from the computing device to a least-loaded gateway device from among the plurality of gateway devices.

12. The non-transitory computer readable medium of claim 11, wherein the least-loaded gateway device and the control gateway device are separate gateway devices.

13. The non-transitory computer readable medium of claim 1, wherein the computing device comprises a parsed client communicatively connected to the group of gateway devices via an untrusted network.

14. A non-transitory computer readable medium containing encoded, non-transient data representing instructions for a programmable computing system that when read and executed by the computing system implements a method for handling failover from a failed gateway device in a group including a plurality of gateway devices, the method comprising:
   determining the existence of a failed gateway device within the group of gateway devices, each of the gateway devices configured to support communication of cryptographically split data;
   determining whether the failed gateway device is a control gateway device for the group of gateway devices; and
   upon determining that the failed device is a control gateway device:
      assigning a remaining gateway device in the group as a new control gateway device;
      notifying network resources to communicate with the new control gateway device;
      notifying the other remaining gateway devices in the group of the identity of the new control gateway device;
   wherein the cryptographically splitting data utilize a plurality of encryption keys to create a plurality of separate community of interest data sets in which the primary write requests and corresponding plurality of secondary write request are members of the community of interest associated with the one of the plurality of encryption keys used in the write requests.

15. The non-transitory computer readable medium of claim 14, further comprising determining at a gateway device within the group of gateway devices non-receipt of a heartbeat message from the failed gateway device.

16. The non-transitory computer readable medium of claim 14, further comprising receiving a message indicating shutdown of the failed gateway device from the failed gateway device.

17. The non-transitory computer readable medium of claim 14, further comprising reassigning computing devices associated with the failed gateway device to one of the remaining gateway devices.

18. The non-transitory computer readable medium of claim 17, further comprising reassigning computing devices associated with the group of gateway devices.

19. The non-transitory computer readable medium of claim 14, wherein each of the gateway devices is a secure network appliance.

* * * * *